United States Patent Office 3,141,006
Patented July 14, 1964

3,141,006
ANIONIC POLYMERIZATION OF LACTAMS WITH DILACTIM ETHERS AS COCATALYSTS
Melvin Ira Kohan, Graylyn Crest, Del., assignor to E. I. du Pont de Nemours and Company, Wilmington, Del., a corporation of Delaware
No Drawing. Filed Sept. 5, 1961, Ser. No. 135,792
13 Claims. (Cl. 260—78)

The present invention relates to an improved process for the anionic polymerization of lactams and, more particularly, to a process for the rapid anionic polymerization of omega-lactams wherein new co-catalysts are used to achieve high polymerization rates and fast polymer set-up times at temperatures well below the polyamide melting point.

Polymerization of ε-caprolactam (hereinafter called simply caprolactam) to the polycarboxamide, 6-nylon, has been known for several decades. In the early caprolactam polymerizations, acidic materials and small amounts of water were used as catalyst, and long polymerization times, i.e., of the order of hours or even days, were required. Later, the polymerization of caprolactam and other omega-lactams was found to occur relatively more rapidly when basic materials, particularly the alkali and alkaline-earth metals, or their compounds, were present and the polymerization system was substantially anhydrous. These base-promoted or anionic polymerizations require temperatures in excess of 200° C. Since these applied temperatures approach or even exceed the polycaprolactam melting point and since the polymerization reaction is moderately exothermic, liquid (molten) polyamide is present during at least part of the anionic polymerization.

Exceeding the melting point of the product polyamide during the polymerization is disadvantageous, particularly when the omega-lactam is polymerized in situ to form a shaped article, coating, or the like. For example, when the high-temperature anionic polymerization procedure is used in casting or molding operations, it is necessary to cool the molds appreciably before the molten or semi-molten articles solidify to an extent such that they can safely be removed. Molding and casting cycles of economically unattractive lengths thus are required. In addition, the high peak temperatures and the wide temperature ranges through which the shaped articles or coatings are cycled often lead to shrinkage voids and other faults in the finished, cooled polymer.

Primarily because of these and other disadvantages inherent in the anionic polymerization of omega-lactams, a variety of co-catalysts derived from inorganic and organic acids have been evaluated in the polymerization in recent years. However, not all the co-catalysts tested heretofore have been entirely satisfactory with respect to one or more of such factors as basic cost and effectiveness in low concentrations; required polymerization temperatures and times; conversions of lactam to polyamide; and polymer molecular weights achieved. Hence the need for new, improved co-catalysts for the anionic polymerization of omega-lactams has continued.

In accord with the present invention, I have found that use of a small amount of a new class of co-catalyst, dilactim ethers, promotes rapid conversion of liquid omega-lactams to solid polycarboxylamides at temperatures from about 25° to 200° C., i.e., well below the polyamide melting point. The dilactim ethers effective as co-catalysts in the anionic polymerization are characterizable by the structural formula:

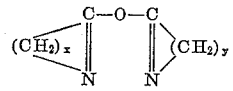

wherein $x$ and $y$ may be alike or different and represent integers of 3 or greater. Representative members of this class of co-catalyst, which will be discussed more fully hereinafter, are, e.g., dibutyrolactim ether, divalerolactim ether, dicaprolactim ether, dienantholactim ether, dicaprylolactim ether, dilaurolactim ether, etc. The dilactim ethers are effective co-catalysts or promoters in the anionic polymerization in concentrations of 2 mole percent or less, based on the lactam.

The polymerization of caprolactam provides an illustration of the process of this invention. Caprolactam which is substantially anhydrous, i.e., contains less than 0.1% water, first is heated to a temperature above its melting point (68–69° C.) but below about 225° C. with a small amount of a base to produce the anionic catalyst therein. All or a portion of the caprolactam to be polymerized may be present in this reaction. Suitable bases are those which are sufficiently strong to react with caprolactam to form an iminium salt of the lactam, which may be represented simply as:

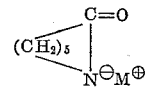

where M signifies a cation, particularly a metal cation. Such bases include particularly the alkali metals, e.g., sodium, potassium, or lithium, the alkaline-earth metals, e.g., magnesium, calcium, strontium, or barium, and compounds of these metals, such as the hydrides, oxides, hydroxides, alkoxides, amides, borohydrides, alkyls, aryls, and the like. The amount of the base may vary from about 0.1 to 10 mole percent of the caprolactam, a base concentration within the range of 0.2 to 5 mole percent generally being preferred.

The time required to prepare the anionic catalyst may vary from a few minutes to several hours, depending on such variables as the type (strength) of the base used, the base concentration, and the reaction temperature. Reaction times up to 2 hours, particularly within the range of 10 to 120 minutes, are generally suitable.

To remove any low-molecular-weight material and also to prevent oxidation, it is desirable to bubble nitrogen or another nonreactive gas through the caprolactam melt during preparation of the anionic catalyst. Alternatively, the reaction of the lactam with the base may be conducted under reduced pressure and low-molecular-weight material removed, together with some caprolactam, by distillation.

Following the preparation of the anionic catalyst, the dilactim ether co-catalyst, optionally mixed with additional caprolactam free of anionic catalyst, is added to the lactam containing the anionic catalyst, and the resulting mixture is heated to and maintained at a temperature of from 100 to 200° C., preferably from about 140 to 180° C., to effect polymerization to solid polycaprolactam. Conversion of caprolactam to polycaprolactam is rapid at these temperatures when the dilactim ether co-catalyst is used in amounts of 0.1 to about 2 mole percent of the total caprolactam, preferably in amounts of 0.3 to 1 mole percent.

As was stated heretofore, the dilactim ether co-catalysts of the present invention are characterizable by the structural formula:

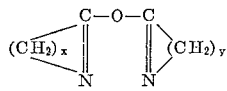

wherein $x$ and $y$ may be alike or different and represent an integer of at least 3. These lactim ethers may be prepared by known methods, viz., condensation of two moles of a lactam of an $\omega$-amino alkanoic acid:

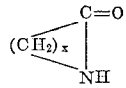

where $x$ has the same significance as above, with one mole of phosgene, generally in an organic solvent medium and at ordinary to moderately elevated temperatures. An alternative and related synthesis which lends the possibility of preparing mixed dilactim ethers, i.e., where $x$ and $y$ represent different integers, also has been described. This latter method involves the reaction of the same class of lactams in the form of acid "salts," such as the lactam hydrochlorides, with excess of phosgene at ambient temperature to produce a lactim chloroformate "salt":

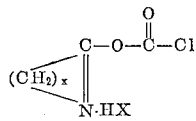

followed by reaction of this "salt" with one mole of a lactam. In either of these syntheses, the final reaction product can be characterized by the formula:

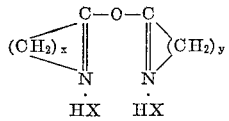

These product "salts" are neutralized with dilute aqueous base to give the free dilactim ethers. While I have assigned to these free (neutralized) dilactim ether products the formula:

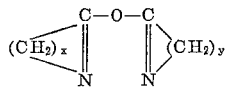

it is possible that part or all of the dilactim ether may convert, during or after the neutralization, to a tautomeric structure:

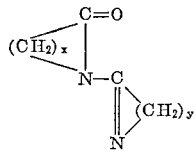

Hence, it is to be understood that by the term dilactim ether, I mean to include not only the true dilactim ether structure but also the tautomeric form.

The dilactim ethers used as co-catalysts in the present process may contain from 4 up to about 21 carbon atoms in each of the two heterocyclic rings (i.e., $x$ and $y$ in the foregoing formulas may be from 3 to about 20). However, based primarily on economic considerations and relative availability, I generally prefer to use dilactim ethers wherein each ring contains from 4 to 12 carbons, i.e., where $x$ and $y$ are integers from 3 to 11, inclusive. These dilactim ethers include:

Dibutyrolactim ether
Divalerolactim ether
Dicaprolactim ether
Dienantholactim ether
Dicaprylolactim ether
Dipelargonolactim ether (or dinonanolactim ether)
Dicaprilactim ether (or didecanolactim ether)
Diun-(or dihen-)decanolactim ether, and
Dilaurolactim ether (or didodecanolactim ether)

the names assigned being based on the common or I.U.C. names of the $\omega$-amino-substituted alkanoic acids from which the dilactim ethers can be considered to be ultimately derived.

The following examples illustrate various modes of effecting anionic polymerization of $\omega$-lactams in the presence of dilactim ether co-catalysts and the advantages of these procedures. However, the present invention should not be considered to be limited to the exact procedures shown in these or any of the subsequent examples.

EXAMPLE 1

To prepare caprolactam containing an anionic catalyst, a mixture of 16 grams of caprolactam containing less than 0.05% water and 0.065 gram (0.85 mole percent) of sodium methoxide was charged to a glass test tube, and the tube was placed in a constant-temperature bath at 150° C. Nitrogen was bubbled through the molten mass at a rate of 350 cc. per minute. After 20 minutes at 150° C., during which no polymerization occurred, 0.059 gram (0.2 mole percent) of dicaprolactim ether was introduced in the anionic catalyst-containing caprolactam melts as a co-catalyst. Following this addition, the bubbling of nitrogen through the melt was continued for approximately 30 seconds, and then the nitrogen inlet tube was raised to allow the gas to pass over the melt. The tube containing the homogeneous, bubble-free melt was maintained in the constant-temperature bath at 150° C., and the polymerizing mass was observed continuously after the addition of the co-catalyst. In 30 minutes, the mass became sufficiently viscous that the meniscus remained undisturbed when the test tube was rotated through an angle of approximately 45°. The first turbidity, indicating the occurrence of crystallization, was seen 32 minutes after the addition of the co-catalyst, and solidification or set-up of the polymerizing mass to a point where no further change could be observed in the appearance of the surface of the mass occurred 36 minutes after the addition. Thirty-nine (39) minutes after the co-catalyst addition, the tube was removed from the bath, dried, cooled to room temperature, and the polymer removed for evaluation. The relative viscosity of the polymer, determined by preparing a solution of 0.42 weight percent of the polymer in 90% formic acid at 25.0° C., was found to be 9.0. The amount of low-molecular-weight material in the polymer was determined by extracting 5 grams of 20-mesh polymer granules with 60 ml. of boiling water for 24 hours. The extractable material by this method constituted 9.6 weight percent of the total polymer product.

Anionic polymerization of caprolactam does not occur under the foregoing conditions without the co-catalyst component. A comparative experiment was conducted in which the above-described procedure was repeated except for the omission of the dicaprolactim ether co-catalyst. Essentially no polymerization occurred after the reaction mixture had been in the constant-temperature bath at 150° C. for 8 hours.

Sodium hydroxide or potassium hydroxide may be used in place of the aforementioned sodium methoxide to prepare the anionic catalyst. For example, anionic catalyst has been prepared by adding 1 mole percent of sodium hydroxide or potassium hydroxide to substantially anhydrous caprolactam and heating the resulting mixture for 1 hour at 100° C. in the case of the sodium hydroxide and at 86° C. in the case of potassium hydroxide. In both cases, nitrogen was bubbled through the lactam melt at an approximate rate of 200 cc. per minute.

EXAMPLES 2-6

The procedure in the runs of these examples (Table I) was the same as that of Example 1, except that the concentrations of sodium methoxide, the types and amounts of the dilactim ether co-catalyst, and the temperature of the constant-temperature bath were those specified in the table.

In Table I, "no-flow" time refers to the period following addition of the dilactim ether co-catalyst required for the polymerizing mass to become sufficiently viscous that the meniscus remained undisturbed when the test tube was tilted through an angle of about 45°. Crystallization time refers to the period needed for the first turbidity to appear in the mass; set-up time refers to the period of time after which no further change could be observed in the appearance of the surface of the polymer mass; and total time signifies the entire period during which the polymerizing mass was in the constant-temperature bath following addition of the co-catalyst. $\eta_r$ refers to relative viscosity and percent E to percent water extractables, both determined as outlined in Example 1.

*Table I*

ANIONIC POLYMERIZATION OF CAPROLACTAM—DIRECT ADDITION OF DILACTIM ETHER CO-CATALYST TO CAPROLACTAM-ANIONIC CATALYST

| Example No. | NaOCH₃ Concn. (mole percent) | Dilactim Ether Cocatalyst | | Bath Temp. (°C.) | "No-flow" Time (min.) | Crystn. Time (min.) | Set-up Time (min.) | Total Time (min.) | $\eta_r$ | Percent E |
|---|---|---|---|---|---|---|---|---|---|---|
| | | Compound | Concn. (mole percent) | | | | | | | |
| 2 | 0.85 | Dicaprolactim ether | 0.4 | 150 | 17 | 21 | 24 | 24.5 | ¹ gel | 4.9 |
| 3 | 1.5 | ___do___ | 1.0 | 175 | 1.75 | 4.75 | 7.5 | 13.5 | 3.3 | 4.5 |
| 4 | 1.5 | ___do___ | 1.0 | 150 | 13.5 | 14 | 16 | 18.5 | 7.4 | 5.4 |
| 5 | 3.0 | ___do___ | 2.0 | 150 | 5 | 6 | 8 | 9.25 | 3.2 | 6.0 |
| 6 | 1.5 | Divalerolactim ether | 0.5 | 175 | 15.5 | | 31 | 35.25 | 5.6 | 5.8 |

¹ I.e., 0.42 wt. percent of the polymer did not dissolve in 90% formic acid at 25.0° C.

EXAMPLES 7 AND 8

The general procedure of the foregoing examples was followed in Examples 7 and 8, except that only one-half (8 grams) of the caprolactam to be polymerized was present during the reaction with sodium methoxide to prepare the anionic catalyst. The other 8 grams of caprolactam was heated separately with the cocatalyst at 150° C. for 20 minutes while passing N₂ through the melt. This preheated cocatalyst-lactam mixture then was added to the anionic-catalyst containing lactam melt. The reaction conditions and results of Examples 7 and 8 are summarized in Table II, where the concentrations of sodium methoxide and of the dilactim ether co-catalyst are both based on the total caprolactam used and the time of addition of the lactam-dilactim ether mixture is considered "zero time" in reporting "no-flow," crystallization, set-up, and total times. Otherwise, the Table II headings have the same significance as those of Table I.

*Table II*

ANIONIC POLYMERIZATION OF CAPROLACTAM—ADDITION OF PREMIXED CAPROLACTAM-DILACTIM ETHER CO-CATALYST STREAM TO CAPROLACTAM-ANIONIC CATALYST STREAM

[1.5 mole percent NaOCH₃; 150° C. bath temperature]

| Example No. | Dicaprolactim Ether Co-catalyst Concn. (mole percent) | "No-flow" Time (min.) | Crystn. Time (min.) | Set-up Time (min.) | Total Time (min.) | $\eta_r$ | Percent E |
|---|---|---|---|---|---|---|---|
| 7 | 0.5 | 10.5 | 11.5 | 12.5 | 14.5 | ¹ gel | 4.6 |
| 8 | 1.0 | 9 | 10.25 | 11.5 | 14.75 | 5.8 | 4.7 |

¹ I.e., 0.42 wt. percent of the polymer did not dissolve in 90% formic acid at 25.0° C.

The quality of caprolactam polymer is assessable not only in terms of such properties as molecular weight and content of low-molecular weight materials but also in terms of physical properties indicative of commercial usefulness. My process gives solid polycaprolactam which is tough and impact resistant and hence is suitable as articles of hardware, such as protective housings for electrical and electronic fixtures and components, and in like applications. The particular advantages of the present process are most readily apparent when the caprolactam is polymerized in situ to form filled or unfilled shaped articles or coatings and polymer-impregnated fibrous webs.

The process of the invention and its advantages have been described in detail in the foregoing. However, many variations within the spirit and scope of the invention will be apparent to those skilled in the polymer arts. In addition to coprolactam, the process of this invention is operative to convert homologous omega-lactams to the corresponding polycarboxylamides. Such lactams include piperidone, pyrrolidone, and carboxylic acids containing seven or more carbon atoms, such as enantholactam, caprylolactam, and laurolactam. Accordingly, I intend to be limited only by the following claims.

I claim:

1. A process for the rapid polymerization of an omega-lactam having from 4 to 12 carbon atoms in the lactam ring to a solid polycarboxylamide which comprises mixing the substantially anhydrous omega-lactam with an anionic catalyst consisting of an iminium salt of an omega-lactam and a cocatalyst consisting of a dilactim ether of the formula:

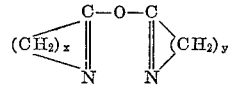

wherein $x$ and $y$ signify integers of at least 3, and maintaining the mixture at a temperature between the fusion point of the omega-lactam and the melting point of the polycarboxylamide until the resulting polycarboxylamide solidifies.

2. A process for the rapid polymerization of caprolactam to solid polycaprolactam which comprises heating to a temperature of from 100 to 200° C. a reaction mixture consisting of substantially anhydrous caprolactam, an anionic catalyst consisting of an iminium salt of an omega-lactam, and a co-catalyst consisting of a dilactim ether of the formula:

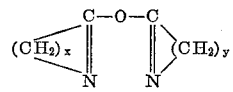

wherein $x$ and $y$ signify integers of at least 3.

3. A process for the rapid polymerization of caprolactam to solid polycaprolactam which comprises heating to a temperature of from 100 to 200° C. a reaction mixture consisting of substantially anhydrous caprolactam, an anionic catalyst consisting of a caprolactiminium salt, and a cocatalyst consisting of a dilactim ether of the formula:

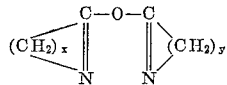

wherein $x$ and $y$ signify integers of from 3 to about 20.

4. The process as claimed in claim 2 wherein the co-catalyst is divalerolactim ether.

5. The process as claimed in claim 3 wherein the co-catalyst is dicaprolactim ether.

6. A process for preparing a solid polycarboxylamide from an omega-lactam having from 4 to 12 carbon atoms in the lactam ring which comprises heating the substantially anhydrous omega-lactam at a temperature above its melting point and below 225° C. with a base selected from the group consisting of alkali metals, alkaline earth metals, and the hydrides, oxides, hydroxides, alkoxides, amides, borohydrides, alkyls, and aryls of said metals to produce an imininum salt of the omega-lactam as anionic catalyst therein; adding to the omega-lactam, which contains said anionic catalyst, a co-catalyst consisting of a dilactim ether of the formula:

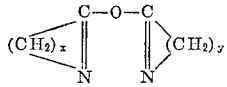

wherein $x$ and $y$ signify integers of from 3 to about 20; and thereafter casting the molten mixture into a mold and maintaining the resulting mixture between the temperature of fusion of the omega-lactam and the melting point of the polycarboxylamide until the resulting polycarboxylamide solidifies.

7. The process as claimed in claim 6 wherein the omega-lactam is caprolactam.

8. The process as claimed in claim 7 wherein an inert gas is passed through the molten caprolactam during the reaction with base to produce an anionic catalyst therein.

9. The process as claimed in claim 7 wherein the base is an alkali metal.

10. The process as claimed in claim 7 wherein the base is sodium methoxide.

11. The process as claimed in claim 7 wherein the base is potassium hydroxide.

12. The process as claimed in claim 6 wherein the co-catalyst added to the omega-lactam, which contains said anionic catalyst, is added as a mixture with the omega-lactam free of anionic catalyst.

13. A process for preparing solid polycaprolactam from caprolactam which comprises heating substantially anhydrous caprolactam at a temperature above its melting point and below 225° C. with 0.1 to 10 mole percent of a base selected from the group consisting of the alkali metals and the hydrides, oxides, hydroxides, alkoxides, amides, borohydrides, alkyls, and aryls of the alkali metals to produce an anionic catalyst therein; adding to the caprolactam which contains said anionic catalyst from 0.1 to about 2 mole percent, based on the caprolactam, of a co-catalyst consisting of a dilactim ether of the formula:

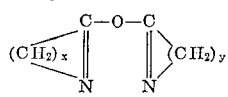

wherein $x$ and $y$ signify integers of 3 to 11 inclusive; and thereafter casting the molten mixture into a mold and maintaining the mixture at a temperature of from 100 to 200° C. to effect polymerization thereof.

References Cited in the file of this patent
UNITED STATES PATENTS 2,356,622　Schlack _____ Aug. 22, 1944
2,767,182　Konz _____ Oct. 16, 1956